Feb. 24, 1970 K. HANNES 3,497,045
GEAR TYPE FLUID CLUTCH
Filed Dec. 13, 1967 2 Sheets-Sheet 1

INVENTOR
Kenneth Hannes
BY Robert E. Kleve
ATTORNEY

Feb. 24, 1970   K. HANNES   3,497,045
GEAR TYPE FLUID CLUTCH
Filed Dec. 13, 1967   2 Sheets-Sheet 2

INVENTOR
Kenneth Hannes
BY Robert E. Kleve
ATTORNEY

United States Patent Office 3,497,045
Patented Feb. 24, 1970

3,497,045
GEAR TYPE FLUID CLUTCH
Kenneth Hannes, 202 Conklin Ave.,
Grand Forks, N. Dak. 58201
Continuation-in-part of application Ser. No. 659,074,
Aug. 8, 1967. This application Dec. 13, 1967, Ser.
No. 700,341
Int. Cl. F16d *31/04, 57/02, 67/00*
U.S. Cl. 192—61                                                  1 Claim

ABSTRACT OF THE DISCLOSURE

The invention comprises a speed changer, having an input and output shaft with a center gear mounted to the input shaft and a gear housing surrounding said center gear and fixed to the output shaft, spur gears rotatably mounted in said gear housing and surrounding the center gear and in engagement therewith, with ports through the output shaft to the spur gears and ports from the spur gears to the outside of the gear housing to receive fluid to regulate the rotation of the spur gears relative to the gear housing and thereby regulate the rotation of the gear housing and output shaft relative to the input shaft, a main housing surrounding the inner ends of the input shaft and output shaft and gear housing and having fluid therein to be transmitted into the spur gears through the ports in the output shaft to provide a source of fluid for operating the charger.

---

This application is a continuation-in-part of my earlier co-pending application, U.S. Ser. No. 659,074, filed, Aug. 8, 1967, and now abandoned. The invention relates to transmissions, more particularly, the invention relates to torque converters.

It is an object of the invention to provide a novel torque converter which can be operated hydraulically to quickly vary the output speed of a drive shaft in relation to the input shaft being driven by a motor.

It is a further object of the invention to provide a novel torque converter which can be inexpensively made and operated hydraulically.

It is another object of the invention to provide a novel torque converter which operates hydraulically and can be readily and easily adapted to motor vehicles and to provide a torque converter which has a balanced even drive and which can provide by a hydraulic operation a wide number of different ratios of speeds.

Further objects and advantages of the invention will become apparent as the description proceeds and when taken in conjunction with the accompanying drawings wherein.

Briefly stated the invention comprises a hydraulic speed changer having an input and output shaft, a central gear mounted to the input shaft, a gear housing mounted to the output shaft, three spur gears rotatably mounted to said gear housing and disposed circumferentially about said central gear and engaging said central gear, hydraulic fluid inlet ports and outlet ports adjacent each side of said spur gears, said ports also being adjacent said central gear, an axially slidable collar mounted to the input shaft and adapted to engage the outlet ports to regulate the flow of fluid from the output ports, said spur gears being adapted to suck in fluid between their teeth from the inlet ports during rotation of said spur gears and transmit the fluid to the outlet ports, whereby the regulation of the flow of fluid out the outlet ports regulates the speed of rotation of the spur gear and thereby regulate the rotation of the gear housing and output shaft relative to the input shaft.

Figure 2:
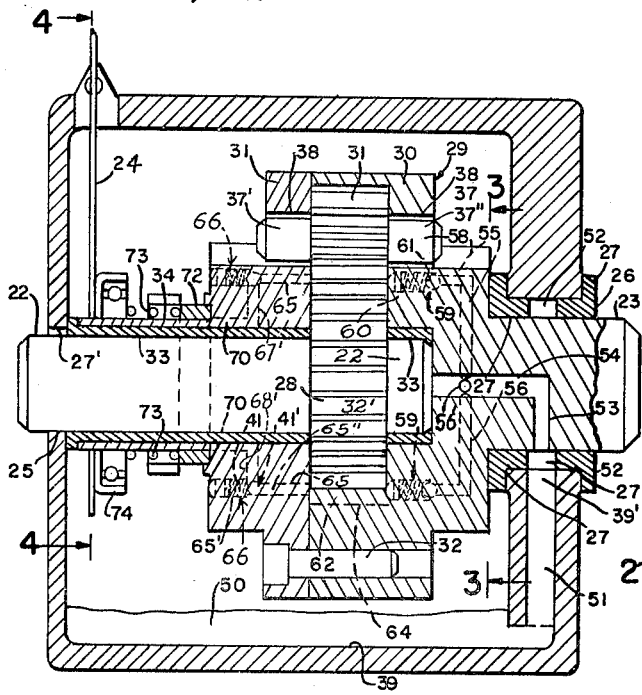
FIGURE 2 is a cross-sectional view taken along line 2—2 of FIGURE 1.
Figure 1:
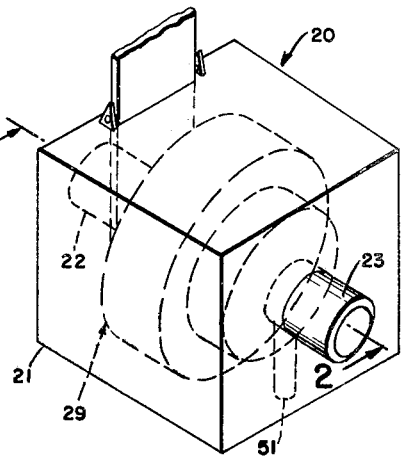
FIGURE 1 is a perspective view of the hydraulic torque converter invention.

Referring more particularly to the drawings, in FIGURES 1 and 2, the torque converter invention 20 is illustrated having an outer housing 21 with an input shaft 22 and an output shaft 23, with a pivotally mounted plate 24 which is pivotally mounted at its upper end to the outer housing and has a pair of legs 24 and 24′ which straddle the input shaft at its lower end.

The outer housing has a pair of holes 25 and 26 with collar bearings 27 and 27′ which provide a rotatable support for the input and output shafts 22 and 23 respectively.

The input shaft 22 has a center gear 28 fixed axially thereto. The output shaft has a gear housing 29 fixed thereto, with the input shaft and output shaft mounted coaxially relative to one another.

The gear housing 29 has an enlarged disc portion 30 formed integrally with the output shaft and a second disc portion 31, which together form the gear housing 29. The disc portions 31 and 32 are held together by three pins 32 which are press fitted into bores 32′ in the disc portions 31 and 32.

The input shaft 22 is rotatably mounted in a bearing sleeve 33, which sleeve 33 is fixed within the projecting sleeve portion 34 of the disc member 31 of the housing 29, whereby the input shaft 22 and center gear 28 are rotatably relative to the gear housing 29. The disc portion 32 has an annular recess 32′ to allow the center gear 28 to rotate relative to the housing 29.

Three identical spur gears 34, 35 and 36 are rotatably mounted housing member 29 and are disposed circumferentially about the center gear 28 and its teeth are engaged with the teeth of the center gear 28. The spur gears 34, 35 and 36 are spaced 120 degrees from one another about the center gear 28. The spur gears each have a pin or shaft 37 which passes through the spur gears and are fixed thereto with the other ends 37′ and 37″ being rotatably mounted in bearing sleeves 38 and 38′ in the disc portions 31 and 32 respectively, the bearing sleeves 38 and 38′ are press fitted in disc members 31 and 32 respectively.

The bottom 39 of the housing 21 has a pool of oil or hydraulic fluid 50, and a bore 51 has its lower end 51′ in communication with the pool of fluid 50. The upper end 51″ of the bore 51 communicates with an annular channel 52 in the collar 27, and the annular channel 52 communicates with a lateral bore 53 in the output shaft 23. The lateral bore communicates with an axial bore 54 and the axial bore 54 communicates with six radial bores 55, 56, 57, 55′, 56′ and 57′.

The radial bores 55–57, 55′–57′ each have a longitudinal inlet bore 58 in communication therewith, and the longitudinal bores 58 each have an enlarged portion 58′ with a check valve 59 therein. The check valve 59 has a coil spring 60 and a ball 60′ which spring urges the ball 60′ against reduced portion 58″ of the longitudinal inlet bore 58 to close the longitudinal bore 58.

The longitudinal inlet bore 58 communicates with cylindrical recesses 61, 62, 63, 61′, 62′ and 63′ respectively. Each spur gear 34, 45, and 36 has a surrounding cylindrical wall portion 64 which surrounds approximately two-thirds of each spur gear, and the cylindrical recesses 61–63, 61'–63' are disposed on each side of the cylindrical wall portions 64.

The disc portion 32 of the gear housing 29 has six longitudinal outlet bores 65 which communicate with the cylindrical recesses 61, 62, 63, 61', 62' and 63' respectively.

The longitudinal outlet bores 65 each have an enlarged cylindrical portion 65' with a check valve 66 therein. The check valve 66 has a spring 41 with a ball 41' which spring urges the ball against the reduced portion 65" of the bore 65 to close the bore 65.

Six radial bores 67, 68, 69, 67', 68' and 69' communicate respectively with the outlet bores 65, and each radial bore 67–69, 67'–69' has a final longitudinal outlet bore 70 which has an open outer end 70' that opens the back wall 71 of the gear housing 29.

An annular collar or ring 72 is spring urged against the open ends 70' of the six outlet bores 70 and acts to regulate the flow of hydraulic fluid out of the ends 70' of the outlet bores 70.

A coil spring 73 is coaxially mounted over the outer sleeve portion 34 of the disc portion 32 of the gear housing 29, and one end of the coil spring abuts the collar 72. A ball bearing ring 74 also surrounds the outer sleeve portion and abuts the other ends of the coil spring 73. The collar 72, spring 73 and bearing ring 74 all are slidable on the sleeve portion 34.

The plate 23 has its lower ends 24 and 24' abutting the bearing ring 74, whereby when the plate 23 is pivoted counterclockwise when viewed from FIGURE 2, it urges the ring 74 from left to right which compresses the spring 73 against the collar 72 and the pressure of collar 72 against the outlet ports 70 closes or reduces the flow of fluid out of the outlet ports and thereby regulates the flow of fluid out of the outlet ports 70.

OPERATION

The torque speed converter 20 may be installed in a conventional vehicle such as a truck with the input shaft 22 connected to the motor of the truck and the output shaft connected to and transmitting power to the drive shaft of the truck. The plate 23 will be manipulated by the operator and will act to change the speed of the drive shaft relative to the motor.

Figure 3:
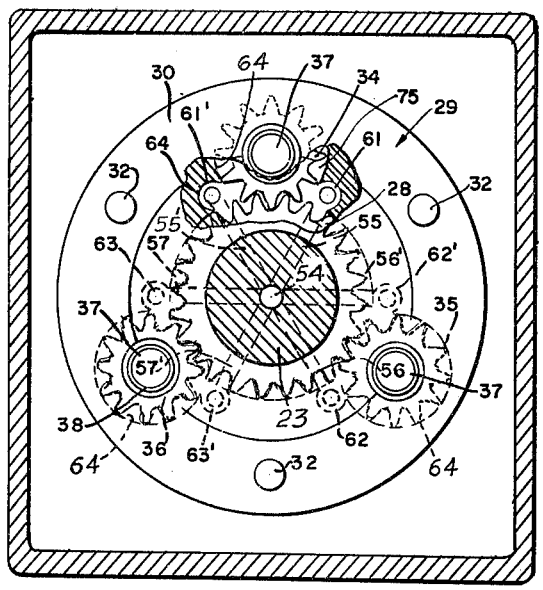
FIGURE 3 is a cross-sectional view taken along line 3—3 of FIGURE 2 and disclosing the front of the gear housing and the inlet hydraulic port construction and gear construction.
Figure 4:
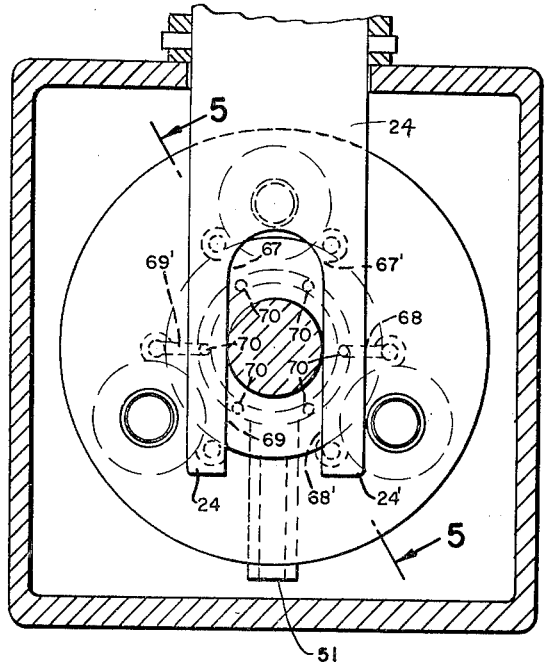
FIGURE 4 is a cross-sectional view taken along line 4—4 of FIGURE 2 and disclosing the back of the gear housing and the construction of the outlet hydraulic ports.
Figure 5:
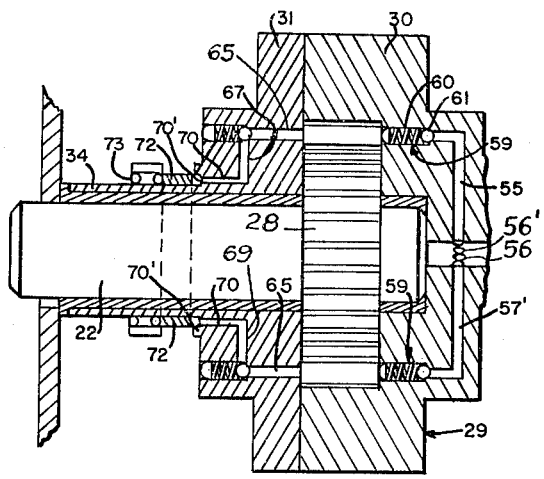
FIGURE 5 is a fragmentary cross-sectional view taken along line 5—5 of FIGURE 4.

Assuming that the input shaft 22 is being rotated clockwise when viewed from FIGURE 3, by the motor of the vehicle, this rotates the center gear 28 clockwise and the center gear 28 thereby rotates the spur gears 34, 35 and 36 counterclockwise when viewed from FIGURE 3. The rotation of the spur gears 34, 35 and 36 counterclockwise draws or sucks hydraulic fluid from the pool 50, up through bore 51, channel 52, lateral bore 53 and axial bore 54, to radial bore 55, 56 and 57 and longitudinal bores 58 where the suction force overcomes the check valve 59 drawing the fluid into the cylindrical recesses 61, 62 and 63, where it is drawn between the teeth of the spur gears around the interior cylindrical wall portion 64 in the space 75 between the teeth and transmitted to the cylindrical recesses 61', 62' and 63' at the outlet ports 65 where it is transmitted to along the three of the outlet bores 65 which communicate with cylindrical recesses 61', 62' and 63' with sufficient pressure or force to overcome the check valves 66 therein and the fluid is transmitted into the radial bores 67', 68 and 69 and into the three outlet bores 70 which communicate with the radial bores 67–69 and out the open ends 70' of the three outlet bores 70 where it will flow out the three outlet bores 70.

The annular collar 72 which is spring urged against all six of the outlet bores 70 will regulate the amount of hydraulic fluid that flows out these ports. By urging the collar 72 against the bores 70, by pivoting the plate 23 counterclockwise when viewed from FIGURE 2, the amount of flow can be reduced and even stopped. The reducing or stopping of the flow out of the three ports 70 reduces or stops the movement of fluid in the outlet ports 65, 67, 68 and 69, and the three corresponding outlet bores 70, and thereby reduces or stops the movement of fluid about the wall portions 64 which reduces or stops the rotation of the spur gears and the reducing of the rotation of the spur gear increases the rotation of the gear housing and output shaft relative to the center gear and input shaft and reduces the ratio of speed of rotation of the output shaft to the input shaft. The output shaft 23 will be rotating in the same direction as the input shaft 22, with speed of the output shaft, varying relative to the input shaft depending upon the position of collar 72. When the outlet ports are completely closed by the collar 72 the output shaft will be rotating at the same ratio (1–1) and in the same direction as the input shaft. When the outlet ports 70 are completely open the output shaft will be stationary while the input shaft rotates. The fluid from the outlet ports 70 flows down and lock into the pool of fluid 50 where it may be reused.

If the input shaft 22 is rotated counterclockwise when viewed from FIGURE 3, center gear 28 will rotate clockwise and the spur gears 34, 35 and 36 will be rotating clockwise. The operation is the same in that the output shaft 23 will rotate in the same direction as the input shaft 22 is rotating, same counterclockwise when viewed from FIGURE 3, with the speed of the output shaft varying relative to the input shaft depending upon the position of collar 72 against the outlet ports 70, except that the fluid from the pool after it passes up through bore 51, channel 52 and axial bore 54, will travel through radial bores 55', 56' and 57' into the other three longitudinal bores 58 where the suction of the spur gears will overcome the check valves 54 therein and allow the fluid to flow into the cylindrical recesses 61', 62' and 63' where it will be transmitted by the clockwise rotation of the spur gears 34–36 about the interior wall portions 64 to the cylindrical recesses 61, 62 and 63 and out through the other three outlet ports 65 where the force will overcome check valves 66 therein and the fluid will be forced into the radial bores 67', 68' and 69' and out the other three outlet bores 70, which communicate with radial bores 67', 68' and 69'. The collar 72 will regulate the flow of fluid out of the other three outlet ports 70 and by urging the collar 72 against the outlet ports will reduce or stop the flow of fluid out of the outlet port 70 and reduce the clockwise rotation of the spur gears when viewed from FIGURE 3, and thereby increase the rate of rotation of the gear housing and output shaft relative to the input shaft. When the outlet ports 70 are completely closed the input and output shafts will be rotating at a 1–1 ratio, while when the outlet ports 70 are completely open the input shaft will be rotating while the output shaft will be stationary and a (1–0) ratio will be achieved.

In the event the vehicle in which the torque converter invention has been installed is going downhill and output shaft 23 being connected to the wheels becomes the driving member, and the input shaft 22 the driven member, the ratio of the shaft 22 to 23 will remain the same as when the shaft 22 was the driving member and the shaft 23 was the driven member, depending upon the position of the collar 72.

Thus it will be seen that a novel simplified speed changer has been provided which will work in either direction.

It will be obvious that various change and departures may be made to the invention without departing from the spirit and scope thereof and accordingly it is not intended that the invention be limited to that specifically described in the specifications or illustrated in the drawings but only as set forth in the appended claim wherein:

What is claimed is:

1. A hydraulic speed charger comprising a main housing, an input shaft having a outer end extending out of said main housing, an output shaft having its outer end extending out of the other side of said main housing, a gear housing mounted to the inner end of said output shaft, a center gear mounted to said input shaft and rotatably mounted in said gear housing, a plurality of spur gears rotatably mounted to said gear housing and spaced at even intervals about the circumference of said center gear and drivably engaging said center gear, hydraulic fluid in said main housing, conduit means transmitting fluid from said main housing to said output shaft, hydraulic fluid inlet ports in said output shaft and gear housing and communicating with said conduit means and communicating with one side of each of said spur gears at a location adjacent said center gear, outlet ports in said gear housing and communicating with the opposite side of said spur gears adjacent said center gear, said input shaft being adapted to rotate relative to said output shaft to thereby draw fluid from said main housing into said inlet ports, said spur gears being adapted to carry fluid from said inlet ports circumferentially about their axis to the outlet ports, collar means to regulate the flow of fluid out said outlet ports and thereby regulate the rotation of the spur gears to thereby regulate the rotation of the output shaft, a pivotally mounted plate actuating said collar, relative to the input shaft.

References Cited

UNITED STATES PATENTS

| | | | |
|---|---|---|---|
| 2,066,450 | 1/1937 | Bascle et al. | 192—61 |
| 2,420,305 | 5/1947 | Donahew et al. | 192—61 |
| 2,502,092 | 3/1950 | Jessup | 192—61 |
| 2,536,200 | 1/1951 | McDonald | 192—61 |
| 3,051,283 | 8/1962 | Bentley | 192—61 |
| 3,064,778 | 11/1962 | Gilreath | 192—61 |
| 3,078,976 | 2/1963 | Whinery et al. | 192—61 |

BENJAMIN W. WYCHE III, Primary Examiner